(12) United States Patent
Sibaja et al.

(10) Patent No.: US 12,572,612 B1
(45) Date of Patent: Mar. 10, 2026

(54) PERSONALIZED SEARCH SYSTEM

(71) Applicant: eBay Inc., San Jose, CA (US)

(72) Inventors: Raymond Alexander Sibaja, Kansas City, MO (US); Tesfa Mesfin Elnatan, Rock Island, IL (US); Tereza McCarthy, Prague (CZ); Vaibhav Vasanth Rao, Sammamish, WA (US); Zixuan Yi, Bellevue, WA (US); Deepak Kota, Tracy, CA (US); Jiyoon Kim, San Francisco, CA (US); Weronika Kolodziej-Teszbir, Wroclaw (PL)

(73) Assignee: EBAY INC., San Jose, CA (US)

( * ) Notice: Subject to any disclaimer, the term of this patent is extended or adjusted under 35 U.S.C. 154(b) by 0 days.

(21) Appl. No.: 19/065,699

(22) Filed: Feb. 27, 2025

(51) Int. Cl.
G06F 16/00 (2019.01)
G06F 3/0485 (2022.01)
G06F 16/9535 (2019.01)

(52) U.S. Cl.
CPC ........ G06F 16/9535 (2019.01); G06F 3/0485 (2013.01)

(58) Field of Classification Search
CPC ............... G06F 16/951; G06F 16/9535; G06F 16/9537; G06F 16/9538; G06F 16/432; G06F 16/438; G06F 16/285; G06F 16/24575; G06F 16/288; G06F 16/22; G06F 16/9032; G06F 8/61; G06F 16/24578; G06F 16/9038; G06F 16/287; G06F 3/0482; G06F 16/248; G06F 8/71; G06F 3/04842;

(Continued)

(56) References Cited

U.S. PATENT DOCUMENTS

| | | | |
|---|---|---|---|
| 8,762,373 B1 * | 6/2014 | Zamir | G06F 16/9535 707/732 |
| 9,659,064 B1 * | 5/2017 | Upstill | G06F 16/951 |

(Continued)

OTHER PUBLICATIONS

Althcek, Ana, "I tried Google's new shopping feature and think it is the future of online shopping", [Online]. Retrieved from the Internet: <https://www.businessinsider.com/google-new-shopping-feature-swipe-clothes-shoes-2024-4>, (Apr. 2024), 11 pgs.

*Primary Examiner* — Yicun Wu
(74) *Attorney, Agent, or Firm* — SCHWEGMAN LUNDBERG & WOESSNER, P.A.

(57) ABSTRACT

Systems and methods are directed providing a personalized search experience. The system receives a broad term query and identifies a plurality of search results, each having a corresponding embedding. The plurality of search results are clustered into embedding clusters. The system then presents a set of prompts whereby each prompt comprises a display of two or more search results, each chosen from a different embedding cluster. With each selection from a prompt, the system narrows down on one or more embedding clusters. Individual search results from the narrowed-down embedding cluster(s) are then displayed and a user can provide an indication of like or dislike. With each indication, the system dynamically updates a user preference embedding that represents an item that the user desires. The updated user preference embedding is then used to identify updated search results having closest corresponding embeddings to the user preference embedding.

20 Claims, 9 Drawing Sheets

(58) Field of Classification Search
CPC ...... G06F 16/58; G06F 16/335; G06F 16/338;
G06F 16/256; G06Q 30/06; G06Q 30/08;
G06Q 30/0257; G06Q 10/10; G06Q
30/0256; G06Q 30/0269; G06Q 30/0631;
G06Q 30/0641; G06Q 30/0603; G06N
3/0464; G06N 7/01; G06N 3/09; G06N
3/0442; G06N 3/044
See application file for complete search history.

(56) References Cited

U.S. PATENT DOCUMENTS

| | | | |
|---|---|---|---|
| 9,733,811 B2 | 8/2017 | Rad et al. | |
| 10,055,462 B2 | 8/2018 | Moxley et al. | |
| 11,537,672 B2 | 12/2022 | Goenka et al. | |
| 12,056,734 B2 * | 8/2024 | Westphal | G06Q 30/0257 |
| 2010/0082434 A1 * | 4/2010 | Chen | G06F 16/9535 |
| | | | 705/14.55 |
| 2015/0169772 A1 * | 6/2015 | Alonso | G06F 16/9535 |
| | | | 707/728 |
| 2021/0034684 A1 * | 2/2021 | Iyer | G06N 3/044 |
| 2025/0131042 A1 * | 4/2025 | Yates | G06Q 30/0641 |
| 2025/0245281 A1 * | 7/2025 | Mehrdad | H04L 67/535 |

* cited by examiner

PERSONALIZED SEARCH SYSTEM

TECHNICAL FIELD

The subject matter disclosed herein generally relates to searching. Specifically, the present disclosure addresses systems and methods that personalizes a search process while reducing central processing unit (CPU) usage.

BACKGROUND

Often, when performing a search query on a database search having a large volume of data, the query can trigger high CPU usage that slows down processing times, especially when handling multiple requests simultaneously. Additionally, querying large datasets can exceed available memory thresholds, causing a computing system to rely upon slower disk-based storage for data retrieval and a degradation in performance. As an example, without proper database indexing, search queries may take a longer time for results to be provided since the computing system is scanning database tables in their entirety rather than utilizing particular indexes for faster data retrieval.

DETAILED DESCRIPTION

The description that follows describes systems, methods, techniques, instruction sequences, and computing machine program products that illustrate examples of the present subject matter. In the following description, for purposes of explanation, numerous specific details are set forth in order to provide an understanding of various examples of the present subject matter. It will be evident, however, to those skilled in the art, that examples of the present subject matter may be practiced without some or other of these specific details. Examples merely typify possible variations. Unless explicitly stated otherwise, structures (e.g., structural components) are optional and may be combined or subdivided, and operations (e.g., in a procedure, algorithm, or other function) may vary in sequence or be combined or subdivided. Systems and methods of the present invention involve a personalized search experience that takes a user from a general search and narrows down to home in on what the user really wants. In example embodiments, a user provides a search request with a broad key term. The system performs a search for results that generally match the broad key term, whereby each search result is associated with an embedding. The system clusters the search results into embedding clusters. The user is then provided a set of options or prompts whereby each prompt comprises a display of two or more search results, each chosen from a different embedding cluster. With each selection of a search result in a prompt, the system narrows down to one or more of the embedding clusters that the user is most interested in (e.g., filtering down on a search intent). To further refine the results, individual search results from the narrowed down one or more embedding clusters are selected and presented to the user. The user can indicate their like or dislike of each individual search result. With each indication, the system dynamically updates a user preference embedding that represents an item that the user desires. Updated search results are identified that have the closest corresponding embeddings to the user preference embedding. These updated search results can be ranked and returned to the user in substantially real-time.

Figure 1:
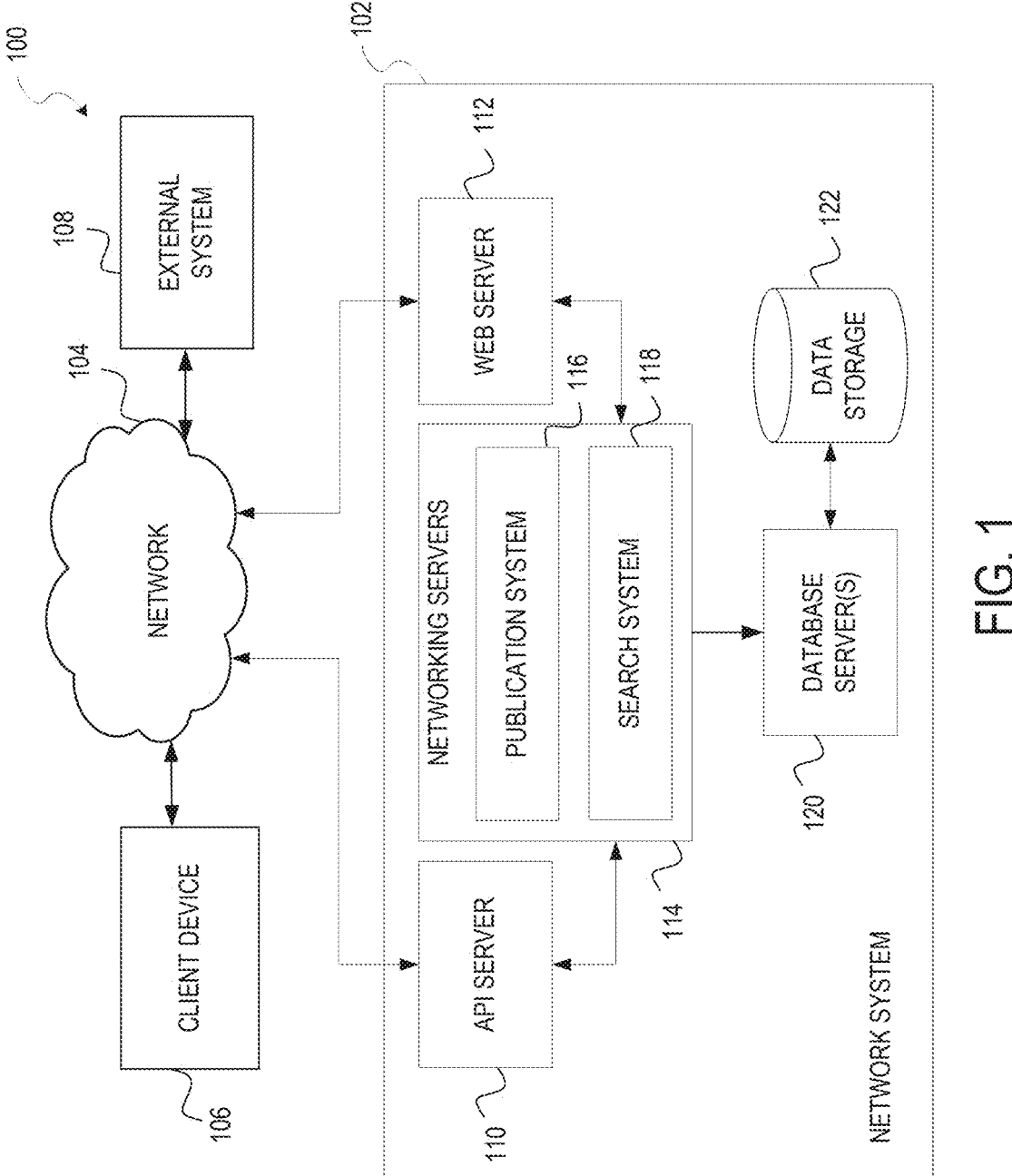
FIG. 1 is a diagram illustrating an example network environment suitable for personalizing a search, according to example embodiments.

As a result, example embodiments provide a technical solution to the technical problem of providing a personalized search experience that narrows down on a user's intent without needing to perform countless searches. In particular, the technical solution utilizes two algorithms to narrow down on desired search results. A first algorithm clusters search results based on embeddings, and search results from the embedding clusters are then used to perform a side-by-side comparison that narrows down on embedding cluster(s) of interest. A second algorithm gauges a user's likes and dislikes (and overall intent) based on their interactions with search results from the narrow-down embedding cluster(s). As a result, one or more of the methodologies described herein may obviate a need for certain efforts or computing resources that otherwise would be involved in performing multiple searches. Examples of such computing resources include processor cycles, network traffic, memory usage, data storage capacity, power consumption, network bandwidth, and cooling capacity FIG. 1 is a diagram illustrating an example network environment 100 suitable for personalizing a search, according to example implementations. A network system 102 provides server-side functionality via a communication network 104 (e.g., the Internet, wireless network, cellular network, or a Wide Area Network (WAN)) to a client device 106. The network system 102 is configured to perform searches in response to a query received from the client device 106, as will be discussed in more detail below.

In various cases, the client device 106 is a device associated with a user of the network system 102. For example, the client device 106 can be a device associated with a user that uses the network system 102 to search for an item, article, place, or any other type of information. The client device 106 may comprise, but is not limited to, a smartphone, a tablet, a laptop, multi-processor systems, microprocessor-based or programmable consumer electronics, a desktop computer, a server, or any other communication device that can access the network system 102. The client device 106 can include an application that exchanges data, via the network 104, with the network system 102. For example, the application can be a browser application or a local version of an application associated with the network system 102 that can provide data to and access data from one or more components at the network system 102.

In example implementations, the client device 106 interfaces with the network system 102 via a connection with the network 104. Depending on the form of the client device 106, any of a variety of types of connections and networks 104 may be used. For example, the connection may be Code Division Multiple Access (CDMA) connection, a Global System for Mobile communications (GSM) connection, or another type of cellular connection. Such a connection may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, or other data transfer technology (e.g., 4G networks, 5G networks). When such technology is employed, the network 104 includes a cellular network that has a plurality of cell sites of overlapping geographic coverage, interconnected by cellular telephone exchanges. These cellular exchanges are coupled to a network backbone (e.g., the public switched telephone network (PSTN), a packet-switched data network, or other types of networks.

In another example, the connection to the network 104 is a Wireless Fidelity (e.g., Wi-Fi, IEEE 802.11x type) connection, a Worldwide Interoperability for Microwave Access (WiMAX) connection, or another type of wireless data connection. In such an example, the network 104 includes one or more wireless access points coupled to a local area network (LAN), a wide area network (WAN), the Internet, or another packet-switched data network. In yet another example, the connection to the network 104 is a wired connection (e.g., an Ethernet link) and the network 104 is a LAN, a WAN, the Internet, or another packet-switched data network. Accordingly, a variety of different configurations are expressly contemplated.

In some embodiments, the external system 108 can be a third-party system that contains data that a user at the client device 106 wants to search. In these embodiments, the network system 102 can trigger a search at the external system and analyze the results obtained from the external system 108. It is noted that the external system 108 is not necessary when the user wants to perform a search within the network system 102.

In other embodiments, the external system 108 can be a third-party system that is associated with an interaction performed on a search result. For example, the user can indicate to post a search result to their inspiration board or social media account at the external system 108.

Turning specifically to the network system 102, an application programing interface (API) server 110 and a web server 112 are coupled to and provide programmatic and web interfaces respectively to one or more networking servers 114. The networking servers 114 host various systems including a publication system 116 and a search system 118, each comprising a plurality of components and each of which can be embodied as a combination of hardware, software, and/or firmware. The networking servers 114 can comprise other system based on the nature of the network system 102.

The publication system 116 is configured to manage publications (e.g., articles, documents, listings of available goods or services) and transactions at the network system 102 including generating and publishing the publications, conducting searches for publications, and/or maintaining user accounts of users of the publication system 116.

The search system 118 is configured to manage a personalized search process. In some embodiments, the search is of publications at the publication system 116. In some embodiments, the search can be of publications at the external system 108. The search system 118 will be discussed in more detail in connection with FIG. 2 below.

The networking servers 114 can be, in turn, coupled to one or more database servers 120 that facilitate access to one or more storage repositories or data storage 122. The data storage 122 is a storage device storing, for example, user accounts including user profiles of users of the network system 102, records of transactions between the users and the network system 102, and user activities with the search system 118 (e.g., past searches).

Any of the systems, data storage, servers, or devices (collectively referred to as "components") shown in, or associated with, FIG. 1 may be, include, or otherwise be implemented in a special-purpose (e.g., specialized or otherwise non-generic) computer that can be modified (e.g., configured or programmed by software, such as one or more software components of an application, operating system, firmware, middleware, or other program) to perform one or more of the functions described herein for that system or machine. For example, a special-purpose computer system able to implement any one or more of the methodologies described herein is discussed below with respect to FIG. 7, and such a special-purpose computer is a means for performing any one or more of the methodologies discussed herein. Within the technical field of such special-purpose computers, a special-purpose computer that has been modified by the structures discussed herein to perform the functions discussed herein is technically improved compared to other special-purpose computers that lack the structures discussed herein or are otherwise unable to perform the functions discussed herein. Accordingly, a special-purpose machine configured according to the systems and methods discussed herein provides an improvement to the technology of similar special-purpose machines.

Moreover, any two or more of the components illustrated in FIG. 1 may be combined, and the functions described herein for any single component may be subdivided among multiple components. Functionalities of one component may, in alternative examples, be embodied in a different component. Additionally, any number of client devices 106 and data storage 122 may be embodied within the network environment 100. While only a single network system 102 is shown, alternatively, more than one network system 102 can be included (e.g., localized to a particular region).

Figure 2:
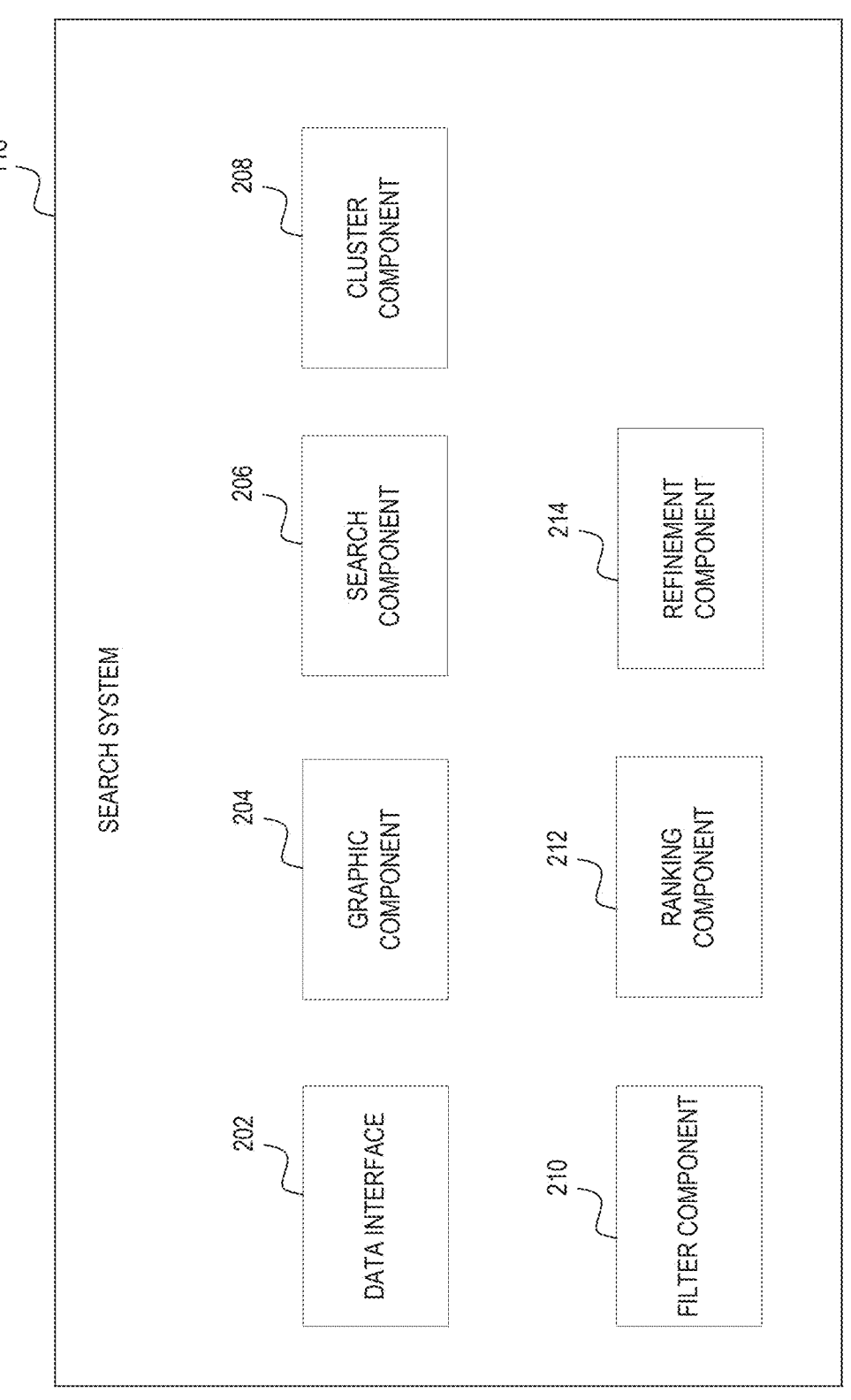
FIG. 2 is a diagram illustrating components of a search system configured to manage a personalized search process, according to example embodiments.

FIG. 2 is a diagram illustrating components of the search system 118, according to example implementations. In example embodiments, the search system 118 comprises a server that manages personalizing a search of a database (e.g., the publication system 116) to a user. Typically, when the user performs a search on a database with a vast amount of information, there is a problem with trying to obtain the user's intent based on a query. This may result in the user needing to perform multiple searches in order to refine their results. The search system 118 helps the user navigate the vast amount of information to find what they are looking for in a computationally efficient manner. To enable these operations, the system 118 comprises a data interface 202, a graphic component 204, a search component 206, a cluster component 208, a filter component 210, a ranking component 212, and a refinement component 214 configured in communication with one another (e.g., via a bus, shared memory, or a switch).

The data interface 202 is configured to exchange data with the client device 106 including managing user graphical interfaces that are displayed on the client device 106. In example embodiments, the data interface 202 configures the client application on the client device 106 to display the graphical interfaces. Additionally, the data interface 202 can receive inputs via the graphical interface from the client device 106 and cause presentation of information on the graphical interface. For example, the data interface 202 can receive a search query with a broad (key) term and user interactions with the graphical interface. The broad term refers to a search query or keyword that is quite general and not specific to a particular detail or niche. For example, a broad term can be "t-shirt," "jeans," or "car." This is opposed to a specific term such as "1998 yellow Ford Mustang GT convertible for sale in Los Angeles." The user interactions can include selections between displays of two or more search results, an indication of like or dislike of individual search results, and/or selecting an individual search result to be placed on a visual board, on a map, in a document repository, or in a cart.

The graphic component 204 is configured to generate graphical interfaces. In some cases, the graphic component 204 generates and causes display of graphical interfaces that display two or more search results in a prompt and requests the user select between the two. The graphical component 204 also generates graphical interfaces that display individual search results and ask the user to indicate like or dislike or perform some other interaction (e.g., place on visual board, place on a map, or place in cart). Graphical interfaces that display updated final search results (e.g., in a tile format) are also generated by the graphic component 204.

The search component 206 is configured to perform a search based on queries received from the client device 106. In example embodiments, the search component 206 receives a query comprising a broad term. The search component 206 then triggers the publication system 116 (or the external system 108) to search for and return a plurality of search results. In an alternative embodiment, the query can be received by the publication system 116 and the publication system 116 performs the search and provides the plurality of search results to the search system 118 for refinement.

Each of the search results (e.g., a publication) comprises a corresponding embedding. In embodiments where the search results (e.g., the publications) are of items or goods, the embedding can comprise a numerical representation of an item based on, for example, a title, aspects/attributes (e.g., brand, size, color), a category, and/or an image. In some embodiments, every time a new publication is published, an embedding component (e.g., of the publication system 116) creates a corresponding embedding). In an alternative embodiment, an embedding component can be included in the search system 118 that generates embeddings for publications that do not already have a corresponding embedding. For example, a title, aspect(s), category, and/or image(s) of each publication can be analyzed to generate the corresponding embedding.

The cluster component 208 is configured to generate embedding clusters and narrow down on the embedding clusters. In example embodiments, the cluster component 208 accesses the embeddings for each of the search results (e.g., each publication). Once the embeddings are accessed, the cluster component 208 uses a clustering algorithm to cluster the search results by their embeddings to create a plurality of embedding clusters.

The cluster component 208 then generates a set of prompts or graphical interfaces that help to narrow-down on cluster embeddings that are of more interest to the user. In some embodiments, the cluster component 208 randomly selects a search result (e.g., a publication) from each of the plurality of embedding clusters and triggers the graphic component 204 to generate the set of prompts or graphic interfaces that each comprises two or more of the randomly selected search results. The set of prompts essentially shows the user a comparison of representations from different embedding clusters. For example, each prompt can comprise a display of images and/or details of the two or more search results and requests the user to select a search result that most appeals to the user or more closely represents what the user is searching for. The user selects one of the search results from each prompt. With each selection of a search result in each prompt, the cluster component 208 narrows down on one or more embeddings clusters. That is, based on the selected search result, the cluster component 208 moves a user embedding preference towards the cluster of the selected search result. This allows the search system 118 to identify larger trends early one and filter down on a general intent of the user.

The set of prompts can comprise any number of prompts. In one embodiment, the set of prompt comprises five prompts. In some embodiments, the number of prompts can be dynamically determined. For example, if after three prompts the cluster component 208 has narrowed down the embedding clusters to a single embedding cluster of interest, the cluster component 208 can stop showing further prompts.

The filter component 210 is configured to identify applicable filtering preferences that can be used to rank search results. In some embodiments, the filter component 210 identifies a category associated with the search query. Based on the category, corresponding filtering preferences are retrieved or generated by the filter component 210. In some embodiments, the filter component 210 can comprise or use a machine learning (ML) model that has been trained on filtering preferences for various categories or search terms. In these embodiments, the search term or category can be applied to the ML model to obtain a set of applicable filter preferences.

The filter component 210 causes presentation of the set of filtering preferences from which the user can select one or more filtering preferences that matter most to the user. For example, if the query is for a laptop, the set of filtering preferences can include, for example, memory amount, storage capability, and screen size. In embodiments where the search is of available items for sale, the set of filtering preferences can also include, for example, fast shipping, price, or seller rating. Some the filtering preferences can be static or set in a profile for the user, such as shipping preferences or seller rating preferences, while other filtering preferences are contextual and dependent on the search query and/or search results (e.g., colors, sizes, capacity). The filter component 210 receives the user selection of the one or more filtering preferences, which then can be used to rank search results in the narrowed-down embedding cluster(s).

The ranking component 212 is configured to rank and rerank search results in the narrowed-down embedding cluster(s) based, in part, on the filtering preferences. In example embodiments, the ranking component 212 comprises a ranking model that ranks the search results. Input features that are applied to the model include a corresponding embedding and context features including the filtering preferences. The context features can also include preferences from the user profile.

The refinement component 214 determines a final or updated set of search results that will be focused on the user's intent. Initially, the refinement component 214 identifies top ranking search results from the narrowed-down one or more embedding clusters. These search results are then displayed individually on a graphical interface that allows the user to perform an interaction that indicates a like or dislike of the search result. For example, the graphical interface can include an icon that represents like (e.g., a check mark or thumbs up) and an icon that represented dislike (e.g., an X mark or thumbs down). The graphical interface can include other icons that apply or use the search result in a manner that indicates that the user likes the search result. For example, the other icons can add the search result (e.g., an item to purchase) to a cart, add the search result (e.g., a particular restaurant, landmark, or other point of interest) to a map, add the search result to a web-based repository of organized content (e.g., a Pinterest board, document repository), or add to a social media network (e.g., add an article to LinkedIn). Additionally, a like signal can also be captured by the user viewing the search result (e.g., view details of the publication) adding a search result to their watchlist or other list, or making a purchase associated with a search result.

With each user indication of like or dislike, the refinement component 214 dynamically updates a user preference embedding that represents an item that the user desires. In one embodiment, the user preference embedding can be an average of the embeddings of search results that the user has liked. Thus, embeddings of all search results that are liked are gathered, and these embeddings can be summed up and divided by the total number of liked search results.

Alternatively, other algorithms can be used to determine the user preference embedding. For example, embeddings of both liked and disliked search results can be used to generate the user preference embedding. In one embodiment, these embeddings can be weighted. As an example, a weight of +1 can be assigned to the embeddings of liked search results and −1 can be assigned to embeddings of disliked search results. A calculated (weighted) average of the embeddings can then be computed based on both the likes and dislikes.

Any number of individual search results can be presented to the user in order to refine the user preference embedding. In some cases, the refinement component 214 can dynamically determine that the user preference embedding needs no further refinement. In other cases, the user can decide that the search results are representing what they want and stop the display of the individual search results and instead, ask for a display of a plurality of search results closest to the user preference embedding (e.g., a tile view of the search results). Further still, the refinement component 214 can have a predetermined number of individual search results to display (e.g., five individual search results).

Based on the user preference embedding, updated search results are determined and displayed to the user. In some embodiments, the update occurs after each user indication and update of the user preference embedding. The refinement component 214 can identify search results that are the closest to the user preference embedding and the ranking component 212 can rerank these search results. Now that user interactions have been captured (e.g., like, dislike, add to cart, view item details), these user interactions can also be used as features that are applied to a ranking model. In one embodiment, the ranking model comprises a multi-gate mixture-of-experts model that uses task-specific gates to allocate shares experts for optimizing objectives (e.g., likes, add to cart, purchases). Each gate determines how much weight each expert contributes to its specific task, balancing engagement (e.g., likes) and satisfaction (e.g., purchases). The output are scores for each search result (e.g., each candidate item), which are aggregated to produce a final ranking. The highest ranked search results can then be displayed individually or in a tile view.

Figure 3:
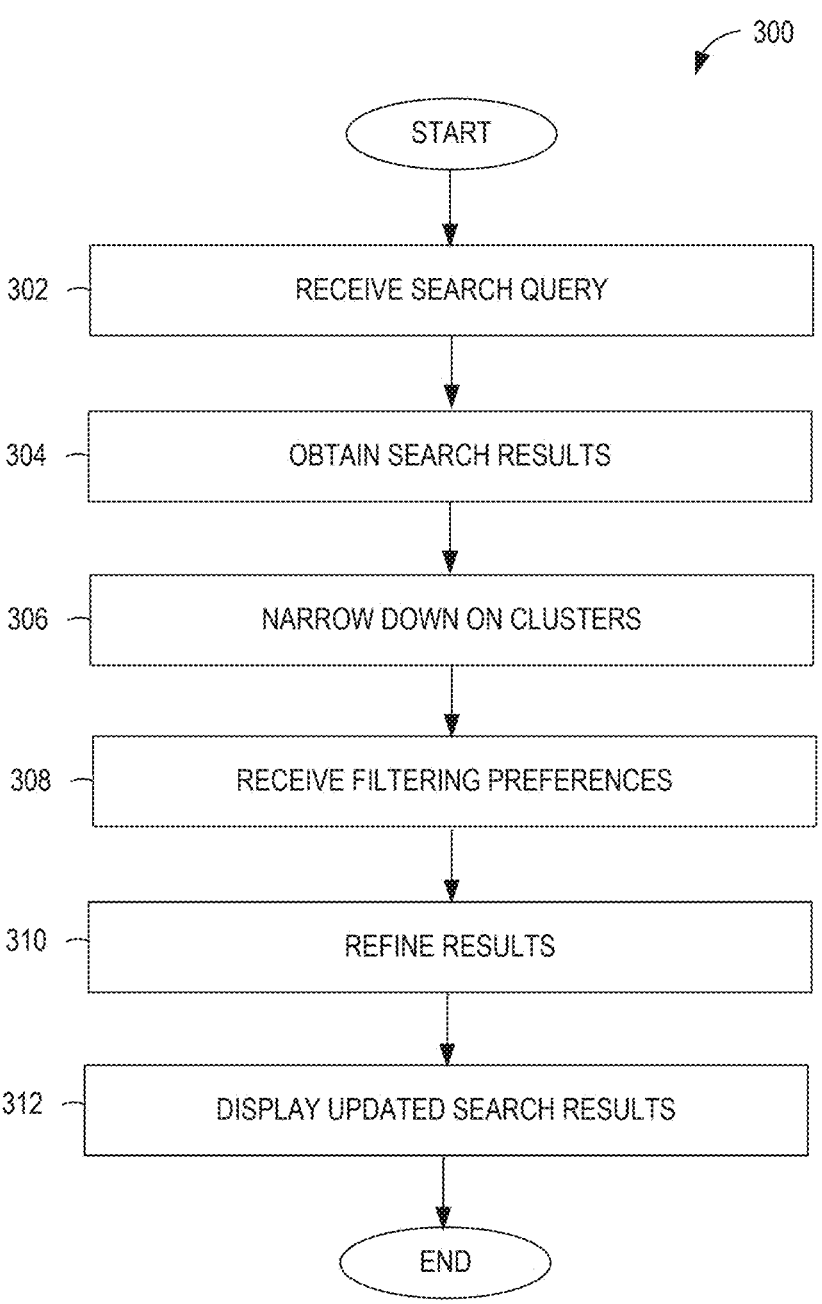
FIG. 3 is a flowchart illustrating a method for personalizing a search, according to example embodiments.

FIG. 3 is a flowchart illustrating a method 300 for personalizing a search, according to example embodiments. Operations in the method 300 may be performed by the search system 118, using components described above in part with respect to FIG. 2. Accordingly, the method 300 is described by way of example with reference to the search system 118. However, it shall be appreciated that at least some of the operations of the method 300 may be deployed on various other hardware configurations or be performed by similar components residing elsewhere in the network environment 100. Therefore, the method 300 is not intended to be limited to the search system 118.

In operation 302, the search system 118 receives a search query. In some embodiments, the data interface 202 receives the search query comprising a broad term entered via a graphical interface presented on the client device 106.

In operation 304, the search system 118 obtains search results from whatever database is being queried. In one embodiment, the search component 206 searches or triggers the publication system 116 to search for and return a plurality of search results based on the broad term. In an alternative embodiment, the query can be received by the publication system 116 and the publication system 116 performs the search and provides the plurality of search results to the search system 118 for refinement.

In operation 306, the cluster component 208 narrows down on clusters of search results. In example embodiments, the narrowing down is part of a personalized search process that is triggered in response to receiving an indication from the user to provide personalized search results. Operation 306 will be discussed in more detail in connection with FIG. 4 below.

In operation 308, the filter component 210 receives selected filtering preferences from the user. In example embodiments, the filter component 210 identifies a set of filtering preferences that are relevant to the query and/or search results. The filter component 210 then causes presentation of the set of filtering preferences from which the user can select one or more filtering preferences that matter most to the user. The filter component 210 receives the user selection of the one or more filtering preferences and can rank search results in the narrowed-down embedding cluster (s) based, in part, on the one or more filtering preferences.

In operation 310, the refinement component 214 refines or updates the search results to provide results that are what the user intended. Operation 310 will be discussed in more detail in connection with FIG. 5 below.

In operation 312, the search system 118 displays the updated search results. In one embodiment, the updated search results can be displayed in a grid or tile format.

Figure 4:
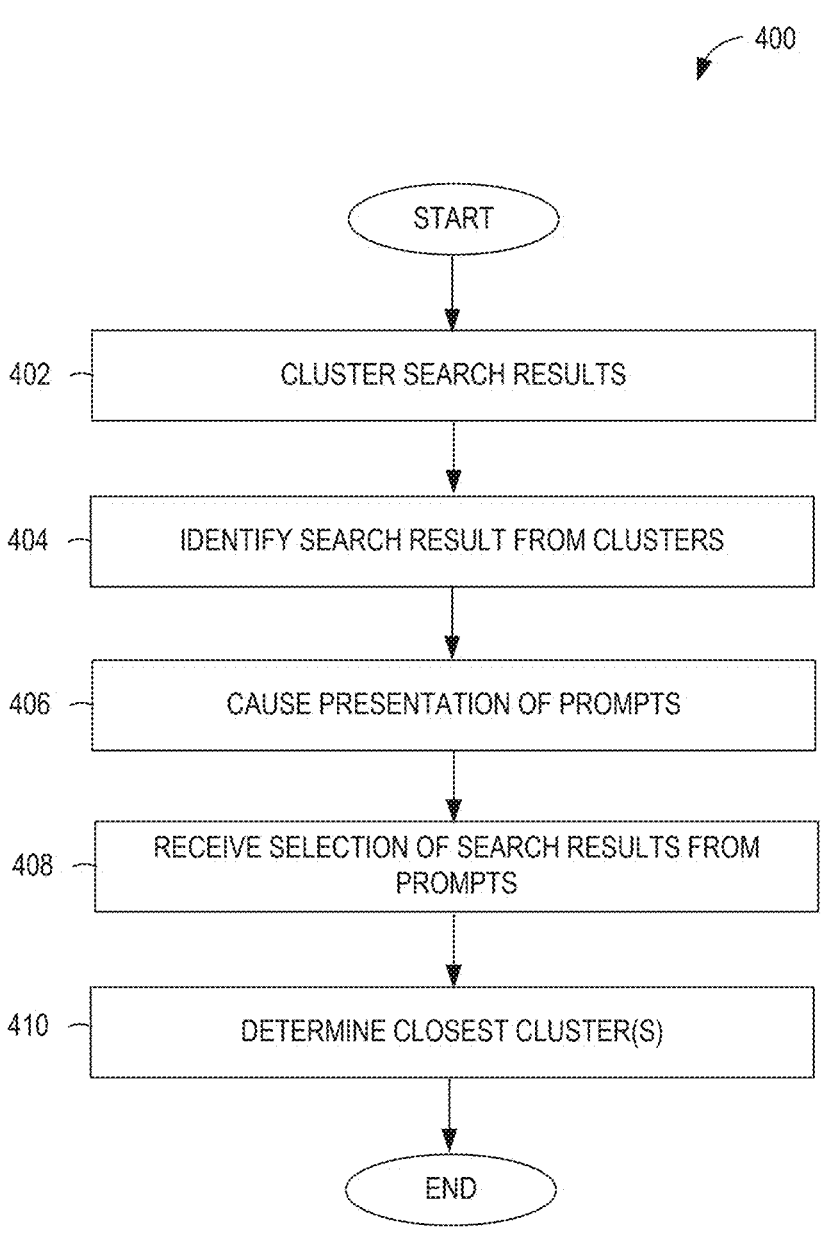
FIG. 4 is a flowchart illustrating a method for narrowing down on clusters during the personalized search process, according to example embodiments.

FIG. 4 is a flowchart illustrating a method 400 (e.g., operation 306) for narrowing down on clusters during the personalized search process, according to example embodiments. Operations in the method 400 may be performed by the search system 118, using components described above in part with respect to FIG. 2. Accordingly, the method 400 is described by way of example with reference to the search system 118. However, it shall be appreciated that at least some of the operations of the method 400 may be deployed on various other hardware configurations or be performed by similar components residing elsewhere in the network environment 100. Therefore, the method 400 is not intended to be limited to the search system 118.

In operation 402, the cluster component 208 clusters search results into embedding clusters. Initially, the cluster component 208 accesses an embedding for each search result. Subsequently, the cluster component 208 uses a clustering algorithm to cluster the search results by their embeddings to create embedding clusters.

In operation 404, cluster component 208 identifies a search result from each of a plurality of the embedding clusters. In example embodiments, the cluster component 208 randomly selects a search result (e.g., a publication) from each of the plurality of embedding clusters.

In operation 406, the cluster component 208 in connection with the graphic component 204 and data interface 202 causes presentation of a set of prompts. In example embodiments, the cluster component 208 triggers the graphic component 204 to generate the set of prompts or graphic interfaces that each comprises two or more of the randomly selected search results from different embedding cluster for comparison. The set of prompts provides a comparison of a representation of the different embeddings clusters from which the user can select the one that most appeals to them. Thus, in operation 408, the cluster component 208 receives a selection of a search result from each prompt.

In operation 410, the cluster component 208 determines one or more closest embedding cluster(s). With each selection of a search result between the two or more search results of each prompt in operation 406, the cluster component 208 narrows down on one or more embeddings clusters by moving closer to the embedding cluster of the selected search result. That is, based on the selected search result (operation 408), the cluster component 208 moves an embedding preference (e.g., a user embedding preference) towards the cluster of the selected search result. Ideally, only a single embedding cluster is identified as the closest embedding cluster in the end.

In some embodiments, operations 406, 408, and 410 are repeated for each prompt. In some embodiments, the prompt or identified search result can change based on what search result was previously selected. For example, if the user selection provides a clear indication that the user is moving towards a first set of embedding clusters and away from a second set of embedding clusters, the next prompt may only provide search results for comparison from the first set of embedding clusters.

Figure 5:
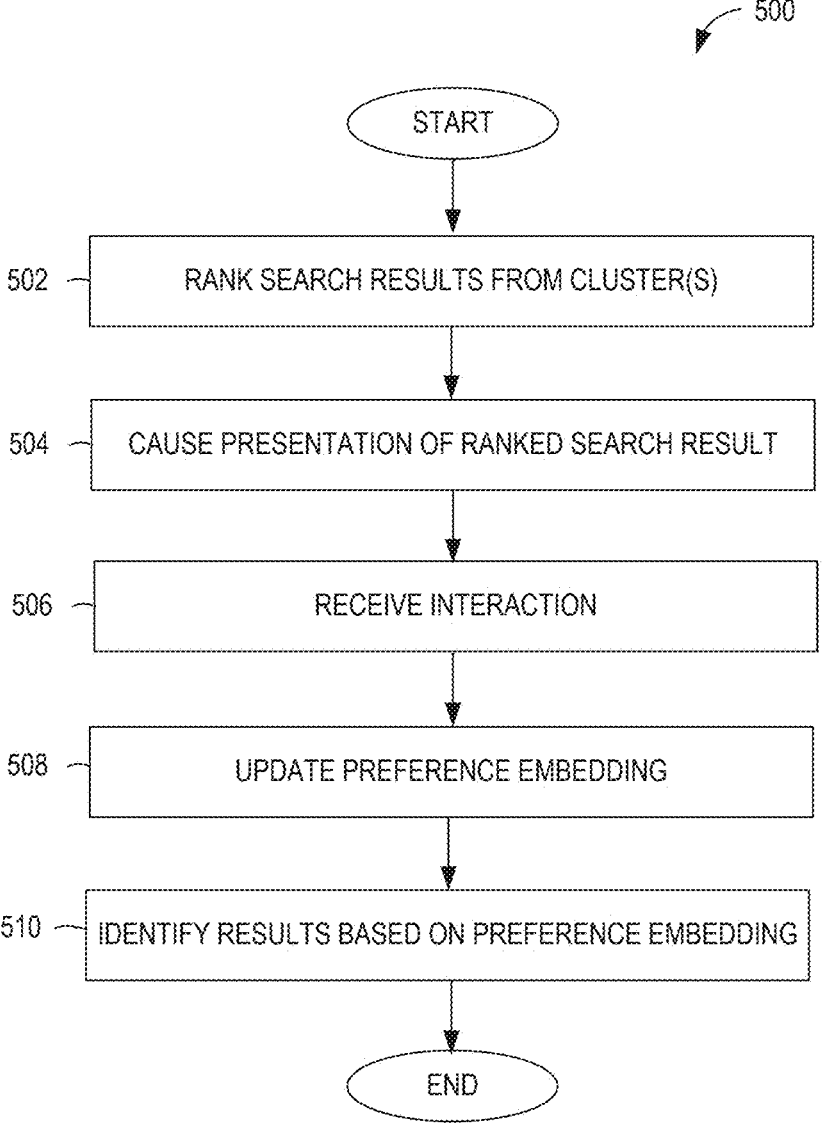
FIG. 5 is a flowchart illustrating a method for refining search results during the personalized search process, according to example embodiments.

FIG. 5 is a flowchart illustrating a method 500 (e.g., operation 310) for refining search results during the personalized search process, according to example embodiments. Operations in the method 500 may be performed by the search system 118, using components described above in part with respect to FIG. 2. Accordingly, the method 500 is described by way of example with reference to the search system 118. However, it shall be appreciated that at least some of the operations of the method 500 may be deployed on various other hardware configurations or be performed by similar components residing elsewhere in the network environment 100. Therefore, the method 500 is not intended to be limited to the search system 118.

In operation 502, the ranking component 212 ranks the search results from narrowed-down one or more embeddings cluster(s). In example embodiments, the ranking is based on the preference filters received in operation 308. Thus, search results in the narrowed-down cluster(s) can be weighted higher based on having a selected filtering preference, whereby greater weight can be given based on having more selected filtering preferences.

In operation 504, the refinement component 214 in connection with the graphic component 204 and data interface

202 causes presentation of highly ranked individual search results on a graphical interface that allows the user to perform an interaction that indicates a like or dislike of the search result. For example, the graphical interface can include an icon that represents like, an icon that represented dislike, and/or a further icon that uses the search result in a manner that indicates that the user likes the search result. For example, the further icon can add the search result to a cart, to a map, to a web-based repository of organized content, or to a social media network. The further icon can also add the search result to a watchlist. A like interaction can also include the user selecting the search result to review its content.

In operation 506, the refinement component 214 (via the data interface 202) receives an indication of an interaction. For example, the indication of the interaction can be a selection of a like icon, a selection of a dislike icon, a selection of the further icon, viewing content of the search result, or other interaction that uses the search result in a manner that indicates the user likes the search result.

In operation 508, the refinement component 214 updates the user preference embedding based on each indication of the interaction. In one embodiment, the user preference embedding can be an average of the embeddings of search results that the user has liked. Thus, with each like or dislike, the refinement component 21 moves closer to search results that the user wants.

In operation 510, the ranking component 212 along with the refinement component 214 updates search results based on the updated user preference embedding. Thus, with each like or dislike, the refinement component 214 can select search results with closest embeddings and the ranking component 212 can rerank these search results to identify the highest-ranking search results to return to the user in substantially real-time.

Thus, example embodiments continuously narrows down on a focus or intent of the search query as more and more signals (e.g., selection of preferences, likes, dislikes) are received from the user. This occurs by first generating embedding clusters and then narrowing down on an embedding cluster that best represents what the user is generally interested in based on a first set of signals (e.g., selection of search result from comparison). Subsequently, a second set of signals is received that indicate filtering preferences used to rank search results in the narrowed-down embedding cluster. Finally, a third set of signals is received based on likes/dislikes of individual search results in the narrowed-down embedding cluster that moves a user preference embedding closer to embeddings of search results in the narrowed-down embedding cluster that the user is most likely interested in.

Figure 6B:
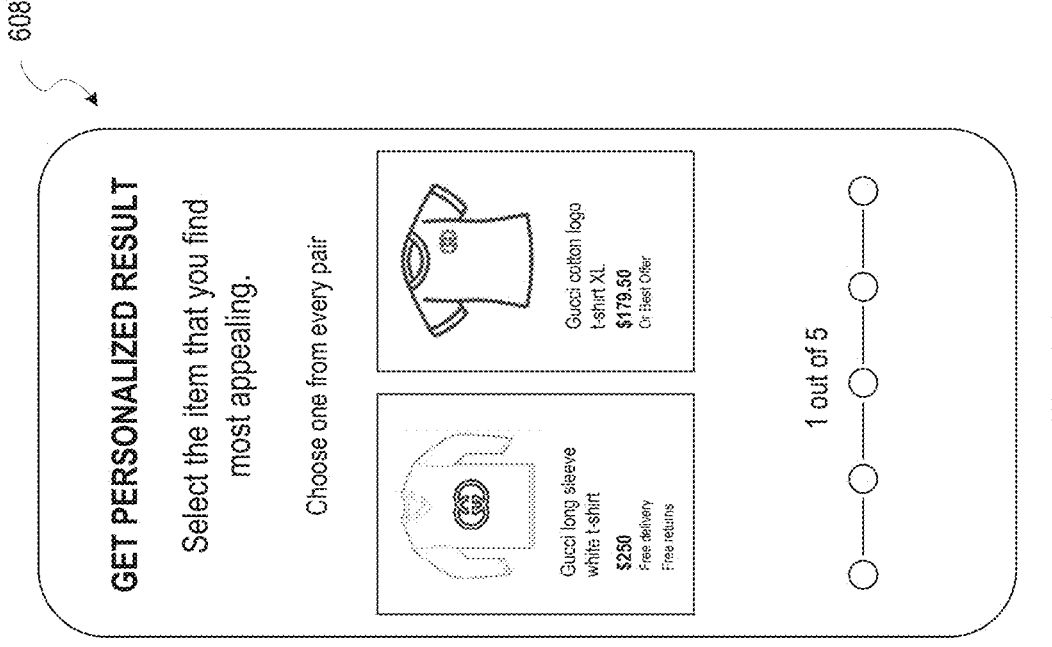
FIG. 6A-FIG. 6F illustrate example graphical user interfaces presented during the personalized search process, according to example embodiments.
Figure 6A:
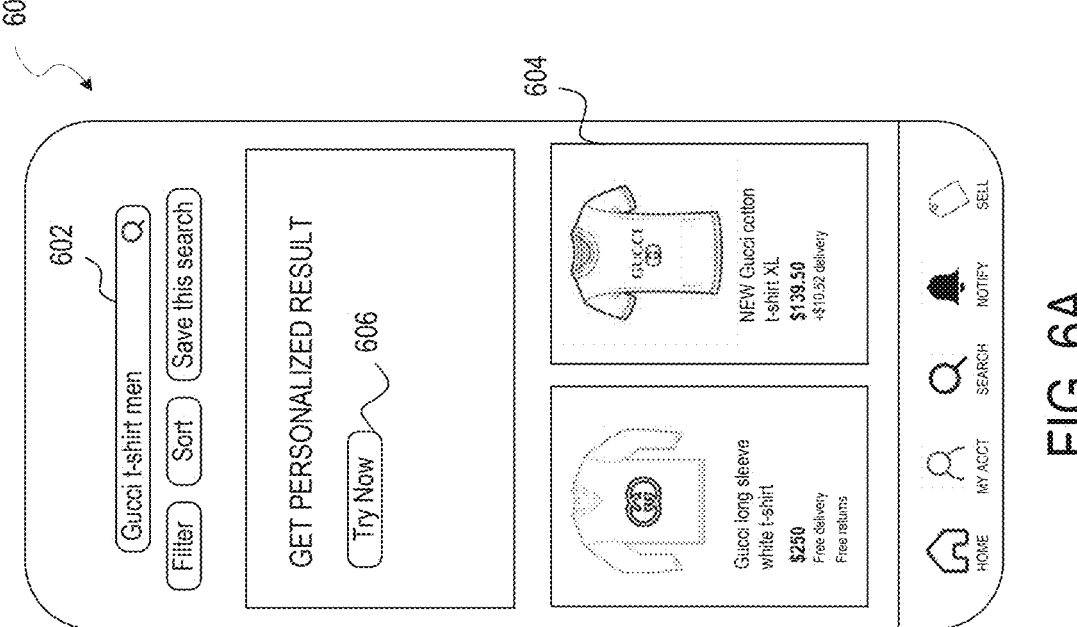

FIG. 6A-FIG. 6F illustrate example graphical user interfaces presented during the personalized search process, according to example embodiments. Referring to FIG. 6A, a graphical interface 600 shows that a user of the client device 106 performed a search using a broad key term of "Gucci t-shirt men" which is shown in a search field 602. In some embodiments, the search component 206 triggers a search for and/or receives search results from the publication system 116. Graphical representations 604 of some of the search results are displayed at a bottom of the graphical interface 600. The user can trigger a personalized search process by selecting a corresponding icon 606 (e.g., "Try Now" icon).

Once the icon 606 is selected, the cluster component 208 clusters search results into embedding clusters. The cluster component 208 then identifies a search result from each of a plurality of the embedding clusters. The cluster component 208 in connection with the graphic component 204 and data interface 202 causes presentation of a set of prompts. FIG. 6B illustrates a graphical interface 608 showing a first prompt. The first prompt comprises a display of two search results selected from two different embedding clusters. The prompt allows the user to compare a representative search result from the two different embedding clusters and indicate which of the two search results is most appealing to them. Based on the user's selection, the cluster component 208 can move a preference embedding closer to the embedding cluster of the selected search result.

Figure 6D:
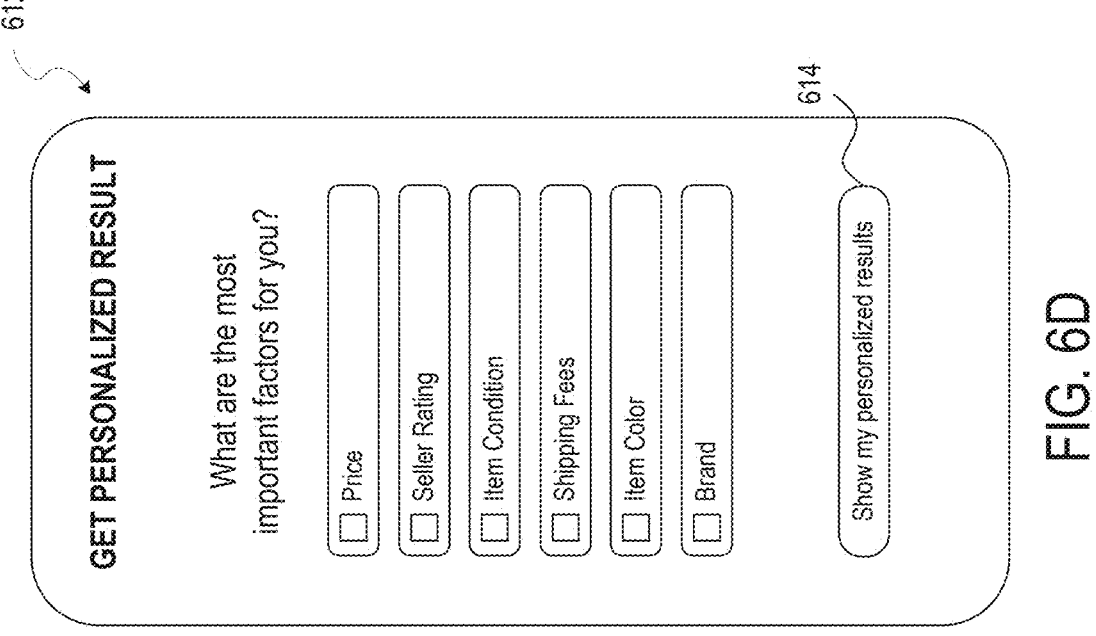
Figure 6C:
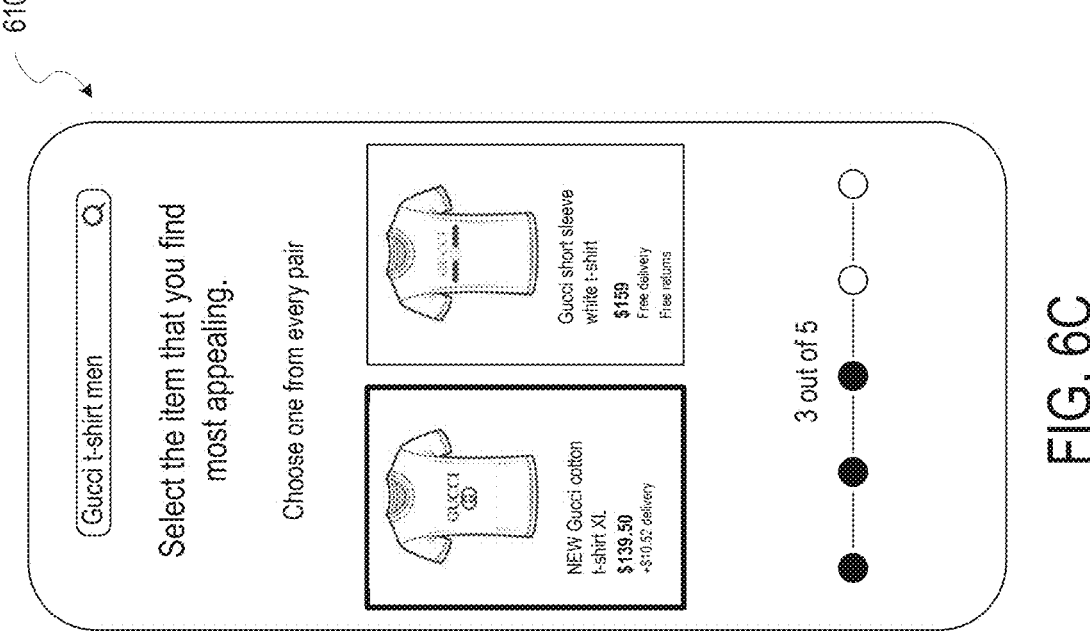
Figure 6F:
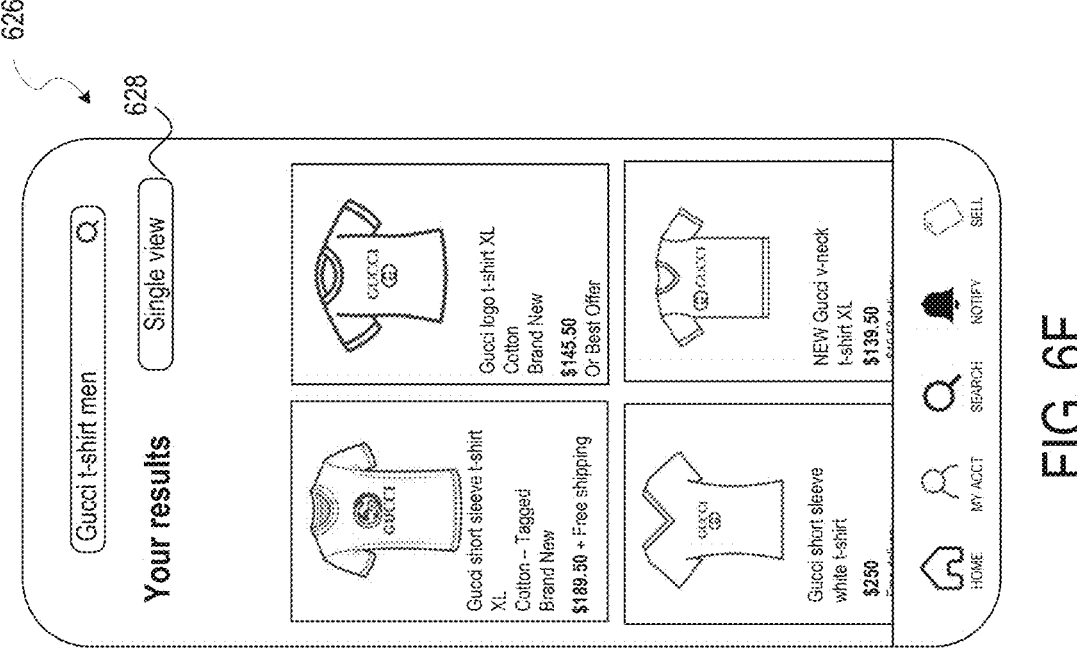

The next prompt can them be shown as illustrated in the graphical interface 610 in FIG. 6C. In some embodiments, the next prompt can comprise search results from two other different embedding clusters, a search result from an embedding cluster that includes a search result that was previously selected, or two search results from two embedding cluster that each includes a search result that was previously selected. The point of each prompt or comparison is to move the user preference embedding closer to one or more embedding clusters that represent what the user is most interested in.

The graphical interfaces 608 and 610 indicate that five prompts will be presented to narrow-down on the embedding cluster. However, any number of prompts can be presented in alternative embodiments. Further still, the cluster component 208 can, in some embodiments, determine that less prompts are need if the selection quickly converges on an embedding cluster and dynamically change the number of prompts shown.

Once the set of prompts have been shown and selections received, the filter component 210 causes presentation of applicable filtering preferences that can be used to rank search results as shown in the graphical interface 612 of FIG. 6D. In some embodiments, the filter component 210 identifies the applicable filtering preferences based on a category associated with the search query. In some embodiments, the filter component 210 can comprise or use a machine learning (ML) model that has been trained on filtering preferences for various categories or search terms to obtain a set of applicable filter preferences. In still further embodiments, the filter component 210 can generate a prompt and trigger a large language model (LLM) to return the applicable filtering preferences.

The filter component 210 then causes presentation of the set of filtering preferences (e.g., factors) from which the user can select one or more filtering preferences that matter most to the user as shown in FIG. 6D. Continuing with the example, the filtering preferences include static filtering preferences which can apply to any item of the publication system (e.g., price, seller rating, item condition, shipping fees) and dynamic filtering preferences which can change based on the category or search query (e.g., item color, brand). Once the user selects the filtering preference(s) that are the most important to them, the user can select an icon 614 that triggers display of their personalized results.

Figure 6E:
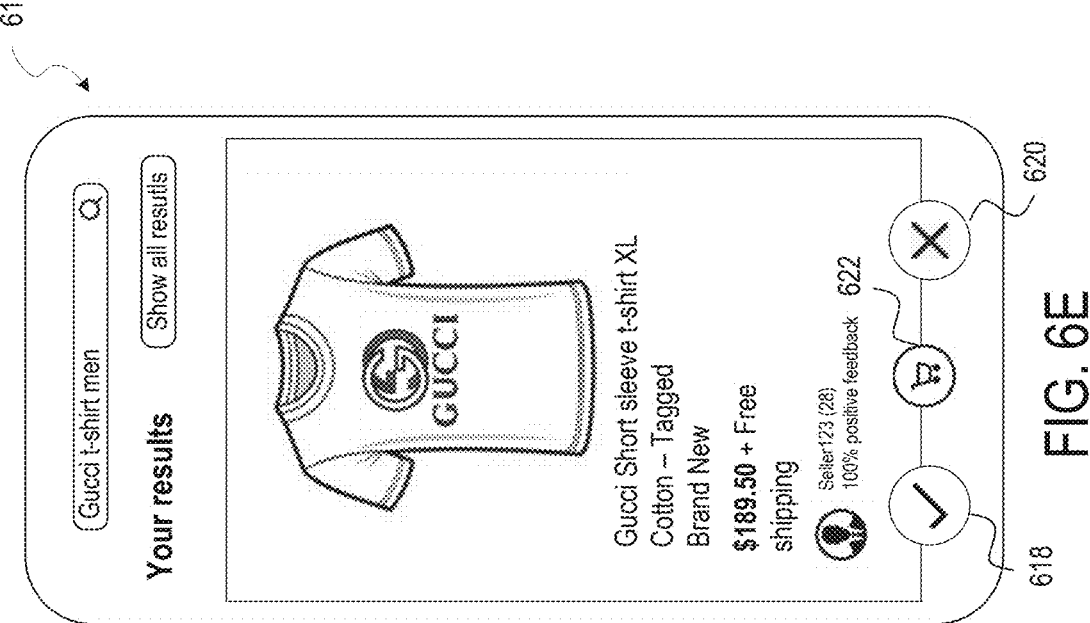

In example embodiments, the ranking component 212 ranks the search results from the narrowed-down one or more embeddings cluster(s) based on the preference filters received from the graphical interface 612 of FIG. 6D. The refinement component 214 in connection with the graphic component 204 and data interface 202 can then cause presentation of highly ranked individual search results. Referring now to FIG. 6E, a graphical interface 616 shows a highly ranked individual search result from the narrowed-down embedding cluster. The graphical interface 616 allows the user to perform an interaction that indicates a like or dislike of the individual search result. In the example of FIG. 6E, the user can like the search result by selecting a like icon 618 (e.g., a checkmark icon) or by swiping in a first direction (e.g. swipe right). The user can dislike the search result by selecting a dislike icon 620 (e.g., an X-mark icon) or by swiping in a second direction (e.g., swipe left). The user can also perform an interaction that indicates a like by adding an item of the search result to a shopping cart by selecting an interaction icon 622 (e.g., shopping cart icon), by purchasing the item, or by selecting the search result to view more details.

The user can indicate a like or dislike for any number of individual search results. Each like or dislike can, in some embodiments, cause a reranking of the search results as the user preference embedding gets updated with each indication. Once the user feels the search results generally are what the user is interested in, the user can select a "show all results" icon 624. This triggers a display of the highly ranked search results in a tile or grid format as shown in a graphical interface 626 of FIG. 6F. The user can return to the individual search result view by selecting a "single view" icon 628. It is noted that the user can toggle back and forth between the individual search result view and the tile/grid view.

While the above example describes an ecommerce environment, example embodiments can be used in other environments. For example, a user can query for a restaurant recommendation nearby. The prompts can comprise search results from embedding clusters that represent different cuisine types. The filtering preferences can provide factors such as type of restaurant (e.g., sit down, fast food, fine dining), cost range (e.g., $, $$, $$$, or $$$$), and ratings range. The individual search results displayed can then be individual restaurants and selection of an interaction icon can add the search result to a map.

In another example, a user can query for a visual inspiration. The prompts can comprise search results from embedding clusters that represent different types of visual inspiration. Depending on the type of visual inspiration, the filtering preferences can provide factors such as, for example, color, price, style, or size. The individual search results displayed can then be individual visual inspirations and an interaction icon can add the search result (e.g., a visual inspiration) to a visual board (e.g., a Pinterest board).

Figure 7:
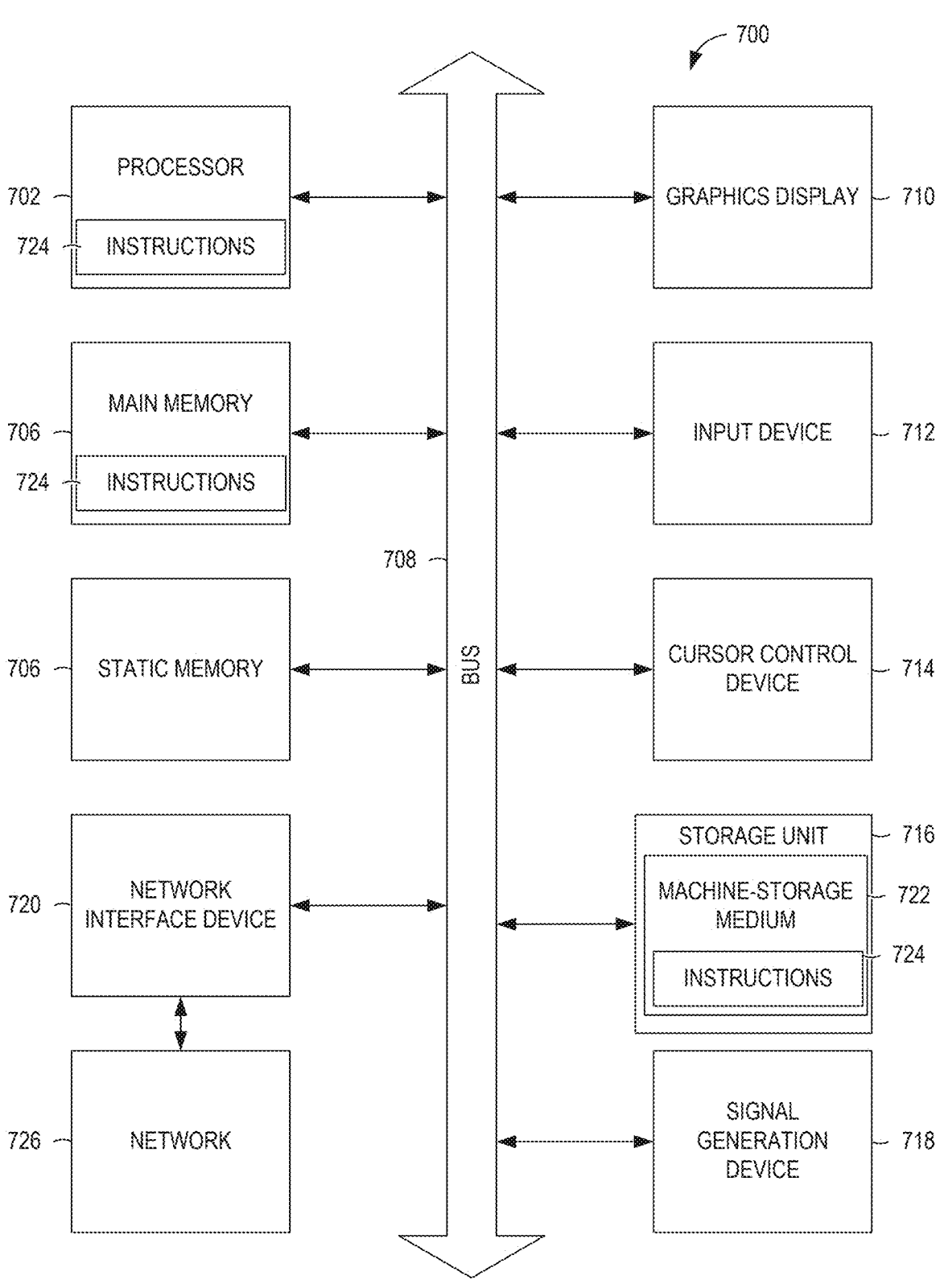
FIG. 7 is a block diagram illustrating components of a machine, according to some examples, able to read instructions from a machine-storage medium and perform any one or more of the methodologies discussed herein.

FIG. 7 illustrates components of a machine 700, according to some example implementations, that is able to read instructions from a machine-storage medium (e.g., a machine-storage device, a non-transitory machine-storage medium, a computer-storage medium, or any suitable combination thereof) and perform any one or more of the methodologies discussed herein. Specifically, FIG. 7 shows a diagrammatic representation of the machine 700 in the example form of a computer device (e.g., a computer) and within which instructions 724 (e.g., software, a program, an application, an applet, an app, or other executable code) for causing the machine 700 to perform any one or more of the methodologies discussed herein may be executed, in whole or in part.

For example, the instructions 724 may cause the machine 700 to execute the flow diagrams of FIG. 3 through FIG. 5. In one implementation, the instructions 724 can transform the machine 700 into a particular machine (e.g., specially configured machine) programmed to carry out the described and illustrated functions in the manner described.

In alternative implementations, the machine 700 operates as a standalone device or may be connected (e.g., networked) to other machines. In a networked deployment, the machine 700 may operate in the capacity of a server machine or a client machine in a server-client network environment, or as a peer machine in a peer-to-peer (or distributed) network environment. The machine 700 may be a server computer, a client computer, a personal computer (PC), a tablet computer, a laptop computer, a netbook, a set-top box (STB), a personal digital assistant (PDA), a cellular telephone, a smartphone, a web appliance, a network router, a network switch, a network bridge, or any machine capable of executing the instructions 724 (sequentially or otherwise) that specify actions to be taken by that machine. Further, while only a single machine is illustrated, the term "machine" shall also be taken to include a collection of machines that individually or jointly execute the instructions 724 to perform any one or more of the methodologies discussed herein.

The machine 700 includes a processor 702 (e.g., a central processing unit (CPU), a graphics processing unit (GPU), a digital signal processor (DSP), an application specific integrated circuit (ASIC), a radio-frequency integrated circuit (RFIC), or any suitable combination thereof), a main memory 704, and a static memory 706, which are configured to communicate with each other via a bus 708. The processor 702 may contain microcircuits that are configurable, temporarily or permanently, by some or all of the instructions 724 such that the processor 702 is configurable to perform any one or more of the methodologies described herein, in whole or in part. For example, a set of one or more microcircuits of the processor 702 may be configurable to execute one or more components described herein.

The machine 700 may further include a graphics display 710 (e.g., a plasma display panel (PDP), a light emitting diode (LED) display, a liquid crystal display (LCD), a projector, or a cathode ray tube (CRT), or any other display capable of displaying graphics or video). The machine 700 may also include an input device 712 (e.g., a keyboard), a cursor control device 714 (e.g., a mouse, a touchpad, a trackball, a joystick, a motion sensor, or other pointing instrument), a storage unit 716, a signal generation device 718 (e.g., a sound card, an amplifier, a speaker, a headphone jack, or any suitable combination thereof), and a network interface device 720.

The storage unit 716 includes a machine-storage medium 722 (e.g., a tangible machine-storage medium) on which is stored the instructions 724 (e.g., software) embodying any one or more of the methodologies or functions described herein. The instructions 724 may also reside, completely or at least partially, within the main memory 704, within the processor 702 (e.g., within the processor's cache memory), or both, before or during execution thereof by the machine 700. Accordingly, the main memory 704 and the processor 702 may be considered as machine-storage media (e.g., tangible and non-transitory machine-storage media). The instructions 724 may be transmitted or received over a network 726 via the network interface device 720.

In some example implementations, the machine 700 may be a portable computing device and have one or more additional input components (e.g., sensors or gauges). Examples of such input components include an image input component (e.g., one or more cameras), an audio input component (e.g., a microphone), a direction input component (e.g., a compass), a location input component (e.g., a global positioning system (GPS) receiver), an orientation component (e.g., a gyroscope), a motion detection component (e.g., one or more accelerometers), an altitude detection component (e.g., an altimeter), and a gas detection component (e.g., a gas sensor). Inputs harvested by any one or more of these input components may be accessible and available for use by any of the components described herein.

Executable Instructions and Machine-Storage Medium

The various memories (e.g., 704, 706, and/or memory of the processor(s) 702) and/or storage unit 716 may store one or more sets of instructions and data structures (e.g., software) 724 embodying or utilized by any one or more of the methodologies or functions described herein. These instructions, when executed by processor(s) 702 cause various operations to implement the disclosed implementations.

As used herein, the terms "machine-storage medium," "device-storage medium," "computer-storage medium" (referred to collectively as "machine-storage medium 722") mean the same thing and may be used interchangeably in this disclosure. The terms refer to a single or multiple storage devices and/or media (e.g., a centralized or distributed database, and/or associated caches and servers) that store executable instructions and/or data, as well as cloud-based storage systems or storage networks that include multiple storage apparatus or devices. The terms shall accordingly be taken to include, but not be limited to, solid-state memories, and optical and magnetic media, including memory internal or external to processors. Specific examples of machine-storage media, computer-storage media, and/or device-storage media 722 include non-volatile memory, including by way of example semiconductor memory devices, for example, erasable programmable read-only memory (EPROM), electrically erasable programmable read-only memory (EEPROM), FPGA, and flash memory devices; magnetic disks such as internal hard disks and removable disks; magneto-optical disks; and CD-ROM and DVD-ROM disks. The terms machine-storage medium or media, computer-storage medium or media, and device-storage medium or media 722 specifically exclude carrier waves, modulated data signals, and other such media, at least some of which are covered under the term "signal medium" discussed below. In this context, the machine-storage medium is non-transitory.

Signal Medium

The term "signal medium" or "transmission medium" shall be taken to include any form of modulated data signal, carrier wave, and so forth. The term "modulated data signal" means a signal that has one or more of its characteristics set or changed in such a matter as to encode information in the signal.

Computer Readable Medium

The terms "machine-readable medium," "computer-readable medium" and "device-readable medium" mean the same thing and may be used interchangeably in this disclosure. The terms are defined to include both machine-storage media and signal media. Thus, the terms include both storage devices/media and carrier waves/modulated data signals. The instructions 724 may further be transmitted or received over a communications network 726 using a transmission medium via the network interface device 720 and utilizing any one of a number of well-known transfer protocols (e.g., HTTP). Examples of communication networks 726 include a local area network (LAN), a wide area network (WAN), the Internet, mobile telephone networks, plain old telephone service (POTS) networks, and wireless data networks (e.g., Wi-Fi, LTE, and WiMAX networks). The term "transmission medium" shall be taken to include any intangible medium that is capable of storing, encoding, or carrying instructions 724 for execution by the machine 700, and includes digital or analog communications signals or other intangible medium to facilitate communication of such software.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

"Component" refers, for example, to a device, physical entity, or logic having boundaries defined by function or subroutine calls, branch points, APIs, or other technologies that provide for the partitioning or modularization of particular processing or control functions. Components may be combined via their interfaces with other components to carry out a machine process. A component may be a packaged functional hardware unit designed for use with other components and a part of a program that usually performs a particular function of related functions. Components may constitute either software components (e.g., code embodied on a machine-readable medium) or hardware components.

A "hardware component" is a tangible unit capable of performing certain operations and may be configured or arranged in a certain physical manner. In various example implementations, one or more computer systems (e.g., a standalone computer system, a client computer system, or a server computer system) or one or more hardware components of a computer system (e.g., a processor or a group of processors) may be configured by software (e.g., an application or application portion) as a hardware component that operates to perform certain operations as described herein.

In some implementations, a hardware component may be implemented mechanically, electronically, or any suitable combination thereof. For example, a hardware component may include dedicated circuitry or logic that is permanently configured to perform certain operations. For example, a hardware component may be a special-purpose processor, such as a field programmable gate array (FPGA) or an ASIC. A hardware component may also include programmable logic or circuitry that is temporarily configured by software to perform certain operations. For example, a hardware component may include software encompassed within a general-purpose processor or other programmable processor. Once configured by such software, hardware components become specific machines (or specific components of a machine) uniquely tailored to perform the configured functions and are no longer general-purpose processors. It will be appreciated that the decision to implement a hardware component mechanically, in dedicated and permanently configured circuitry, or in temporarily configured circuitry (e.g., configured by software), may be driven by cost and time considerations.

Accordingly, the term "hardware component" should be understood to encompass a tangible entity, be that an entity that is physically constructed, permanently configured (e.g., hardwired), or temporarily configured (e.g., programmed) to operate in a certain manner or to perform certain operations described herein. Considering examples in which hardware components are temporarily configured (e.g., programmed), each of the hardware components need not be configured or instantiated at any one instance in time. For example, where the hardware component comprises a general-purpose processor configured by software to become a special-purpose processor, the general-purpose processor may be configured as respectively different special-purpose processors (e.g., comprising different hardware components) at different times. Software may accordingly configure a processor, for example, to constitute a particular hardware component at one instance of time and to constitute a different hardware component at a different instance of time.

Hardware components can provide information to, and receive information from, other hardware components. Accordingly, the described hardware components may be regarded as being communicatively coupled. Where multiple hardware components exist contemporaneously, communications may be achieved through signal transmission (e.g., over appropriate circuits and buses) between or among two or more of the hardware components. In examples in which multiple hardware components are configured or instantiated at different times, communications between such hardware components may be achieved, for example, through the storage and retrieval of information in memory structures to which the multiple hardware components have access. For example, one hardware component may perform an operation and store the output of that operation in a memory device to which it is communicatively coupled. A further hardware component may then, at a later time, access the memory device to retrieve and process the stored output. Hardware components may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented components that operate to perform one or more operations or functions described herein. As used herein, "processor-implemented component" refers to a hardware component implemented using one or more processors.

Similarly, the methods described herein may be at least partially processor-implemented, a processor being an example of hardware. For example, at least some of the operations of a method may be performed by one or more processors or processor-implemented components. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an application program interface (API)).

The performance of certain of the operations may be distributed among the one or more processors, not only residing within a single machine, but deployed across a number of machines. In some example implementations, the one or more processors or processor-implemented components may be located in a single geographic location (e.g., within a home environment, an office environment, or a server farm). In other example implementations, the one or more processors or processor-implemented components may be distributed across a number of geographic locations.

EXAMPLES

Example 1 is a method for proving a personalized search experience. The method comprises receiving a search request with a broad term from a user; identifying a plurality of search results based on the broad term, each search result comprising a corresponding embedding; clustering the plurality of search results into embedding clusters; causing presentation of a set of prompts whereby each prompt comprises a display of two or more search results, each chosen from a different embedding cluster; with each selection of a search result between the two or more search results of each prompt, narrowing down on one or more embedding clusters of the plurality of search results that the user is most interested in; causing presentation of individual search results from the narrowed-down one or more embedding clusters; receiving, a user indication of whether the user likes or dislikes each of the individual search results; with each user indication, dynamically updating a user preference embedding that represents an item that the user desires, the updated user preference embedding being used to identify updated search results having closest corresponding embeddings to the user preference embedding; and dynamically identifying the updated search results to be displayed to the user based on the updated user preference embedding after each user indication.

In example 2, the subject matter of example 1 can optionally include wherein causing presentation of the set of prompts comprises displaying images of the two or more search results and a request for the user to select a search result that most appeals to the user.

In example 3, the subject matter of any of examples 1-2 can optionally include wherein the causing presentation of the set of prompts is in response to receiving an indication, from the user, to provide personalized search results.

In example 4, the subject matter of any of examples 1-3 can optionally include wherein the embeddings each comprises a numerical representation of an item based on a title, aspects, and a category.

In example 5, the subject matter of any of examples 1-4 can optionally include wherein the numerical representation is also based on an image associated with the item.

In example 6, the subject matter of any of examples 1-5 can optionally include wherein the updated user preference embedding comprises an average of embeddings of individual search results the user has indicated as like.

In example 7, the subject matter of any of examples 1-6 can optionally include causing presentation of a set of filtering preferences from which the user selects one or more filtering preferences that matters most to the user; and based on the selected one or more filtering preferences, ranking search results in the one or more narrowed-down embedding clusters, wherein the causing presentation of the individual search results from the narrowed-down one or more embedding clusters is based on the ranking.

In example 8, the subject matter of any of examples 1-7 can optionally include determining the set of filtering preferences based on a category of the plurality of search results.

In example 9, the subject matter of any of examples 1-8 can optionally include wherein the user indication comprises a swipe in a first direction to indicate like and a swipe in a second direction to indicate dislike.

In example 10, the subject matter of any of examples 1-9 can optionally include wherein the user indication comprises selecting one of the individual search results to be placed on a visual board, on a map, or in a cart.

Example 11 is a system for providing a personalized search experience. The system comprises one or more processors and a memory storing instructions that, when executed by the one or more processors, cause the one or more processors to perform operations comprising receiving a search request with a broad term from a user; identifying a plurality of search results based on the broad term, each search result comprising a corresponding embedding; clustering the plurality of search results into embedding clusters; causing presentation of a set of prompts whereby each prompt comprises a display of two or more search results, each chosen from a different embedding cluster; with each selection of a search result between the two or more search results of each prompt, narrowing down on one or more embedding clusters of the plurality of search results that the user is most interested in; causing presentation of individual search results from the narrowed-down one or more embedding clusters; receiving, a user indication of whether the user likes or dislikes each of the individual search results; with each user indication, dynamically updating a user preference embedding that represents an item that the user desires, the updated user preference embedding being used to identify updated search results having closest corresponding embeddings to the user preference embedding; and dynamically identifying the updated search results to be displayed to the user based on the updated user preference embedding after each user indication.

In example 12, the subject matter of example 11 can optionally include wherein causing presentation of the set of prompts comprises displaying images of the two or more search results and a request for the user to select a search result that most appeals to the user.

In example 13, the subject matter of any of examples 11-12 can optionally include wherein the causing presentation of the set of prompts is in response to receiving an indication, from the user, to provide personalized search results.

In example 14, the subject matter of any of examples 11-13 can optionally include wherein the embeddings each comprises a numerical representation of an item based on a title, aspects, and a category.

In example 15, the subject matter of any of examples 11-14 can optionally include wherein the numerical representation is also based on an image associated with the item.

In example 16, the subject matter of any of examples 11-15 can optionally include wherein the updated user preference embedding comprises an average of embeddings of individual search results the user has indicated as like.

In example 17, the subject matter of any of examples 11-16 can optionally include wherein the operations further comprise causing presentation of a set of filtering preferences from which the user selects one or more filtering preferences that matters most to the user; and based on the selected one or more filtering preferences, ranking search results in the one or more narrowed-down embedding clusters, wherein the causing presentation of the individual search results from the narrowed-down one or more embedding clusters is based on the ranking.

In example 18, the subject matter of any of examples 11-17 can optionally include wherein the operations further comprise determining the set of filtering preferences using a machine learning model.

In example 19, the subject matter of any of examples 11-18 can optionally include wherein the user indication comprises selecting one of the individual search results to be placed on a visual board, on a map, or in a cart.

Example 20 is a machine-storage medium comprising instructions which, when executed by one or more processors of a machine, cause the machine to perform operations for providing a personalized search experience. The operations comprise receiving a search request with a broad term from a user; identifying a plurality of search results based on the broad term, each search result comprising a corresponding embedding; clustering the plurality of search results into embedding clusters; causing presentation of a set of prompts whereby each prompt comprises a display of two or more search results, each chosen from a different embedding cluster; with each selection of a search result between the two or more search results of each prompt, narrowing down on one or more embedding clusters of the plurality of search results that the user is most interested in; causing presentation of individual search results from the narrowed-down one or more embedding clusters; receiving, a user indication of whether the user likes or dislikes each of the individual search results; with each user indication, dynamically updating a user preference embedding that represents an item that the user desires, the updated user preference embedding being used to identify updated search results having closest corresponding embeddings to the user preference embedding; and dynamically identifying the updated search results to be displayed to the user based on the updated user preference embedding after each user indication.

Some portions of this specification may be presented in terms of algorithms or symbolic representations of operations on data stored as bits or binary digital signals within a machine memory (e.g., a computer memory). These algorithms or symbolic representations are examples of techniques used by those of ordinary skill in the data processing arts to convey the substance of their work to others skilled in the art. As used herein, an "algorithm" is a self-consistent sequence of operations or similar processing leading to a desired result. In this context, algorithms and operations involve physical manipulation of physical quantities. Typically, but not necessarily, such quantities may take the form of electrical, magnetic, or optical signals capable of being stored, accessed, transferred, combined, compared, or otherwise manipulated by a machine. It is convenient at times, principally for reasons of common usage, to refer to such signals using words such as "data," "content," "bits," "values," "elements," "symbols," "characters," "terms," "numbers," "numerals," or the like. These words, however, are merely convenient labels and are to be associated with appropriate physical quantities.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or any suitable combination thereof), registers, or other machine components that receive, store, transmit, or display information. Furthermore, unless specifically stated otherwise, the terms "a" or "an" are herein used, as is common in patent documents, to include one or more than one instance. Finally, as used herein, the conjunction "or" refers to a non-exclusive "or," unless specifically stated otherwise.

Although an overview of the present subject matter has been described with reference to specific examples, various modifications and changes may be made to these examples without departing from the broader scope of examples of the present invention. For instance, various examples or features thereof may be mixed and matched or made optional by a person of ordinary skill in the art. Such examples of the present subject matter may be referred to herein, individually or collectively, by the term "invention" merely for convenience and without intending to voluntarily limit the scope of this application to any single invention or present concept if more than one is, in fact, disclosed.

The examples illustrated herein are believed to be described in sufficient detail to enable those skilled in the art to practice the teachings disclosed. Other examples may be used and derived therefrom, such that structural and logical substitutions and changes may be made without departing from the scope of this disclosure. The Detailed Description, therefore, is not to be taken in a limiting sense, and the scope of various examples is defined only by the appended claims, along with the full range of equivalents to which such claims are entitled.

Moreover, plural instances may be provided for resources, operations, or structures described herein as a single instance. Additionally, boundaries between various resources, operations, modules, engines, and data stores are somewhat arbitrary, and particular operations are illustrated in a context of specific illustrative configurations. Other allocations of functionality are envisioned and may fall within a scope of various examples of the present invention. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of examples of the present invention as represented by the appended claims. The specification and drawings are, accordingly, to be regarded in an illustrative rather than a restrictive sense.

What is claimed is:
1. A method comprising:
receiving a search request with a broad term from a user;
identifying a plurality of search results based on the broad term, each search result comprising a corresponding embedding;
clustering the plurality of search results into embedding clusters;
causing presentation of a set of prompts whereby each prompt comprises a display of two or more search results, each chosen from a different embedding cluster;
with each selection of a search result between the two or more search results of each prompt, narrowing down on one or more embedding clusters of the plurality of search results that the user is most interested in;
causing presentation of individual search results from the narrowed-down one or more embedding clusters;
receiving, a user indication of whether the user likes or dislikes each of the individual search results;
with each user indication, dynamically updating a user preference embedding that represents an item that the user desires, the updated user preference embedding being used to identify updated search results having closest corresponding embeddings to the user preference embedding; and dynamically identifying the updated search results to be displayed to the user based on the updated user preference embedding after each user indication.

2. The method of claim 1, wherein causing presentation of the set of prompts comprises displaying images of the two or more search results and a request for the user to select a search result that most appeals to the user.

3. The method of claim 1, wherein the causing presentation of the set of prompts is in response to receiving an indication, from the user, to provide personalized search results.

4. The method of claim 1, wherein the embeddings each comprises a numerical representation of an item based on a title, aspects, and a category.

5. The method of claim 4, wherein the numerical representation is also based on an image associated with the item.

6. The method of claim 1, wherein the updated user preference embedding comprises an average of embeddings of individual search results the user has indicated as like.

7. The method of claim 1, further comprising:

causing presentation of a set of filtering preferences from which the user selects one or more filtering preferences that matters most to the user; and based on the selected one or more filtering preferences, ranking search results in the one or more narrowed-down embedding clusters, wherein the causing presentation of the individual search results from the narrowed-down one or more embedding clusters is based on the ranking.

8. The method of claim 7, further comprising:

determining the set of filtering preferences based on a category of the plurality of search results.

9. The method of claim 1, wherein the user indication comprises a swipe in a first direction to indicate like and a swipe in a second direction to indicate dislike.

10. The method of claim 1, wherein the user indication comprises selecting one of the individual search results to be placed on a visual board, on a map, or in a cart.

11. A system comprising:

one or more processors; and a memory storing instructions that, when executed by the one or more processors, cause the one or more processors to perform operations comprising:

receiving a search request with a broad term from a user;

identifying a plurality of search results based on the broad term, each search result comprising a corresponding embedding;

clustering the plurality of search results into embedding clusters;

causing presentation of a set of prompts whereby each prompt comprises a display of two or more search results, each chosen from a different embedding cluster;

with each selection of a search result between the two or more search results of each prompt, narrowing down on one or more embedding clusters of the plurality of search results that the user is most interested in;

causing presentation of individual search results from the narrowed-down one or more embedding clusters;

receiving, a user indication of whether the user likes or dislikes each of the individual search results;

with each user indication, dynamically updating a user preference embedding that represents an item that the user desires, the updated user preference embedding being used to identify updated search results having closest corresponding embeddings to the user preference embedding; and dynamically identifying the updated search results to be displayed to the user based on the updated user preference embedding after each user indication.

12. The system of claim 11, wherein causing presentation of the set of prompts comprises displaying images of the two or more search results and a request for the user to select a search result that most appeals to the user.

13. The system of claim 11, wherein the causing presentation of the set of prompts is in response to receiving an indication, from the user, to provide personalized search results.

14. The system of claim 11, wherein the embeddings each comprises a numerical representation of an item based on a title, aspects, and a category.

15. The system of claim 14, wherein the numerical representation is also based on an image associated with the item.

16. The system of claim 11, wherein the updated user preference embedding comprises an average of embeddings of individual search results the user has indicated as like.

17. The system of claim 11, wherein the operations further comprise:

causing presentation of a set of filtering preferences from which the user selects one or more filtering preferences that matters most to the user; and based on the selected one or more filtering preferences, ranking search results in the one or more narrowed-down embedding clusters, wherein the causing presentation of the individual search results from the narrowed-down one or more embedding clusters is based on the ranking.

18. The system of claim 17, wherein the operations further comprise:

determining the set of filtering preferences using a machine learning model.

19. The system of claim 11, wherein the user indication comprises selecting one of the individual search results to be placed on a visual board, on a map, or in a cart.

20. A machine-storage medium comprising instructions which, when executed by one or more processors of a machine, cause the machine to perform operations comprising:

receiving a search request with a broad term from a user;

identifying a plurality of search results based on the broad term, each search result comprising a corresponding embedding;

clustering the plurality of search results into embedding clusters;

causing presentation of a set of prompts whereby each prompt comprises a display of two or more search results, each chosen from a different embedding cluster;

with each selection of a search result between the two or more search results of each prompt, narrowing down on one or more embedding clusters of the plurality of search results that the user is most interested in;

causing presentation of individual search results from the narrowed-down one or more embedding clusters;

receiving, a user indication of whether the user likes or dislikes each of the individual search results;

with each user indication, dynamically updating a user preference embedding that represents an item that the user desires, the updated user preference embedding being used to identify updated search results having closest corresponding embeddings to the user preference embedding; and dynamically identifying the updated search results to be displayed to the user based on the updated user preference embedding after each user indication.

* * * * *